(12) United States Patent
Joshi et al.

(10) Patent No.: US 9,683,498 B2
(45) Date of Patent: Jun. 20, 2017

(54) TURBOCHARGER COMPRESSOR ANTI-SURGE ENGINE CONTROL STRATEGY AND METHOD

(71) Applicant: Caterpillar Inc., Peoria, IL (US)

(72) Inventors: Urvish Joshi, Dunlap, IL (US); Travis Barnes, Metamora, IL (US); Eric W. Cler, Oswego, IL (US); Anand KrishnamurthyGopalan, Edwards, IL (US); Eric A. Hutchison, Peoria, IL (US); Kirti Tamhane, Dunlap, IL (US); Andrew N. Schifferer, Batavia, IL (US); Tyler Bowman, Canonsburg, PA (US); Kevin Sergott, Dunlap, IL (US); Matthew Mowers, Peoria, IL (US); Daniel R. Puckett, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 213 days.

(21) Appl. No.: 14/716,603

(22) Filed: May 19, 2015

(65) Prior Publication Data

US 2016/0341136 A1    Nov. 24, 2016

(51) Int. Cl.
| F02D 41/00 | (2006.01) |
| F02D 41/18 | (2006.01) |
| F02D 31/00 | (2006.01) |
| F02B 37/12 | (2006.01) |
| F02D 41/02 | (2006.01) |

(52) U.S. Cl.
CPC ....... *F02D 41/0007* (2013.01); *F02D 31/001* (2013.01); *F02D 41/18* (2013.01); *F02B 2037/125* (2013.01); *F02D 41/0225* (2013.01)

(58) Field of Classification Search
CPC .... F02D 41/0007; F02D 31/001; F02D 41/18; F02D 41/0225; F02B 2037/125
See application file for complete search history.

(56) References Cited

U.S. PATENT DOCUMENTS

| 6,345,602 | B1 | 2/2002 | Maddock et al. |
| 6,945,047 | B2 | 9/2005 | Shea et al. |
| 7,089,738 | B1 | 8/2006 | Boewe et al. |
| 7,137,253 | B2 | 11/2006 | Furman et al. |
| 7,322,194 | B2 | 1/2008 | Sun et al. |
| 8,191,369 | B2 | 6/2012 | Geyer et al. |
| 8,307,645 | B2 | 11/2012 | Mischler et al. |
| 2011/0208400 | A1* | 8/2011 | Lickfold ............... F02C 9/32 701/100 |
| 2015/0089940 | A1* | 4/2015 | Sivasubramaniam F02B 37/004 60/602 |
| 2016/0201584 | A1* | 7/2016 | Jankovic ............. F02D 41/0007 123/564 |
| 2016/0265468 | A1* | 9/2016 | Takayanagi ........... F02B 37/013 |

* cited by examiner

*Primary Examiner* — Joseph Dallo

(57) ABSTRACT

A method for operating an internal combustion engine includes monitoring engine parameters using an electronic controller, determining a surge speed limit for the engine based on a compressor map, determining an offset engine speed based on a margin between the surge speed limit and an engine speed, determining a minimum engine speed based on the margin, applying the offset engine speed to an engine speed signal to provide an adjusted engine speed, and applying the adjusted engine speed to a desired engine speed when a speed of the engine approaches the surge speed limit.

20 Claims, 7 Drawing Sheets

TURBOCHARGER COMPRESSOR ANTI-SURGE ENGINE CONTROL STRATEGY AND METHOD

TECHNICAL FIELD

This patent disclosure relates generally to internal combustion engines and, more particularly, to engine speed control strategies.

BACKGROUND

Engines sometimes use turbochargers to extract work from engine exhaust gas and transfer at least some of the extracted work to a compressor, which operates to increase engine boost pressure and, thus, engine power. Because one or more turbochargers can be associated with an engine, and turbocharger operation directly relates to gas and air pressures in the engine exhaust and intake systems, operation of the turbocharger itself can be affected by the engine operating conditions. When the engine operating conditions are changing with time, which are generally referred to as transient engine operating conditions, the various system pressures and air flow or exhaust flow rates may change, which will cause corresponding changes to the turbocharger input and output conditions, in this way affecting the efficiency of the turbocharger.

One particular operating condition of a turbocharger compressor that appears under certain operating conditions is compressor surge. A surge will typically occur in a compressor when a compressor impeller speed is reduced and air from a high pressure side or outlet side of the compressor is allowed to flow backwards through the compressor from the outlet side to the low pressure side or inlet of the compressor. Such conditions can appear, for example, when engine speed and load are reduced in a short period. Compressor surging may cause a further reduction in impeller speed, which is detrimental to compressor efficiency, especially if an increase in engine speed and impeller speed shortly follows the surge.

Certain engine applications that may normally and frequently experience substantial reductions in engine speed and load, for example, engines for stationary generators, marine applications, or earthmoving equipment, may be more prone to compressor surging than other engine applications. In one particular application such as a wheel loader, the engine turbocharger may surge numerous times during a loading operation, which includes using full engine load to push a loader bucket into a pile, and reducing engine load to about zero when the loader can no longer move into the pile. When a surge event occurs, engine fuelling or fuel command may drop from a large value to a small or zero value, i.e., the fueling or loading command drastically reduces. As the engine fuel or load reduces, a compressor pressure ratio, which expresses the pressure ratio of air at the outlet of the compressor over air pressure at the inlet of the compressor, begins to drop, as does the speed of the impeller of the compressor. Surge occurs when the compressor pressure ratio suddenly reverses its trend and spikes momentarily, before continuing to decline to a steady-state value.

Although compressor surging can cause physical damage to the compressor, even if it does not, it robs power from the compressor, which can result in lower compressor efficiencies and lower engine efficiency over a particular work cycle. Accordingly, compressor surging for certain engine applications operating under conditions favorable for compressor surging should be avoided or minimized. Various engine control strategies for reducing or avoiding surging have been proposed in the past. U.S. Pat. No. 6,954,047, for example, proposes increasing engine idle speed when a surge event is detected and, if no more than three surges are detected over an hour of engine operation, the engine speed is again reduced to a normal value. However, this, and other proposed solutions, may unnecessarily increase engine fuel consumption without conclusively avoiding a surge condition. Moreover, the resulting back flow of air from the engine intake system, which is at a higher pressure than a compressor inlet but that drops during a compressor surge, causes oscillations in the intake manifold pressure. These oscillations cause a further loss of engine performance and a surge or a "bark" noise to occur, which is noticeable to an operator.

SUMMARY OF THE DISCLOSURE

In one aspect, the disclosure describes a method for operating an engine. The method includes monitoring engine parameters using an electronic controller, determining a surge speed limit for the engine based on a compressor map, the surge speed limit for the engine representing an engine speed below which operating conditions of a compressor of the engine will cause the compressor to surge, determining an offset engine speed based on a margin between the surge speed limit and the engine speed, determining a minimum engine speed based on the margin, applying the offset engine speed to an engine speed signal to provide an adjusted engine speed; and applying the adjusted engine speed to a desired engine speed when a speed of the engine approaches the surge speed limit.

In another aspect, the disclosure describes an internal combustion engine. The internal combustion engine includes a turbocharger having a turbine connected to an exhaust system of the internal combustion engine and a compressor connected to an intake system of the internal combustion engine, a mass airflow (MAF) sensor disposed to provide a MAF signal that is indicative of an engine MAF entering the compressor, at least one pressure sensor disposed to provide a pressure signal that is indicative of a pressure ratio across the compressor, an engine speed sensor disposed to provide an engine speed signal that is indicative of an engine speed of the internal combustion engine, and an electronic controller associated with the internal combustion engine and arranged to receive and monitor the MAF signal, the pressure signal and the engine speed signal, the electronic controller operating to provide a desired engine speed signal to the internal combustion engine.

The electronic controller is programmed to store in non-volatile memory a compressor map onto which an operating point of the compressor can be determined based on the MAF signal and the pressure signal, the compressor map further including a surge line at which the compressor will operate in a surge condition, determine, based on the compressor map, a surge speed limit for the engine speed, the surge speed limit representing the engine speed below which the compressor will surge, determine an offset engine speed based on a margin between the surge speed limit and the speed of the internal combustion engine, determine a minimum desired engine speed based on the margin, apply the offset engine speed to the engine speed signal to provide an adjusted engine speed, and apply the adjusted engine speed to the desired engine speed signal.

In yet another aspect, the disclosure describes a method for operating an engine having a turbine connected to an exhaust system of the engine and a compressor connected to an intake system of the engine. The method includes receiving in a controller a MAF signal that is indicative of an engine MAF entering the compressor, receiving in the controller a pressure signal that is indicative of a pressure ratio across the compressor, receiving in the controller an engine speed signal that is indicative of an engine speed, and using the controller to control a speed of the engine. The controller is programmed to store in non-volatile memory a compressor map onto which an operating point of the compressor can be determined based on the MAF signal and the pressure signal, the compressor map further including a surge line at which the compressor will operate in a surge condition, determine, based on the compressor map, a surge speed limit for the engine speed, the surge speed limit representing the engine speed below which the compressor will surge, determine an offset engine speed based on a margin between the surge speed limit and the speed of the engine, determine a minimum desired engine speed based on the margin, apply the offset engine speed to the engine speed signal to provide an adjusted engine speed, and apply the adjusted engine speed to a desired engine speed signal.

DETAILED DESCRIPTION

Figure 1:
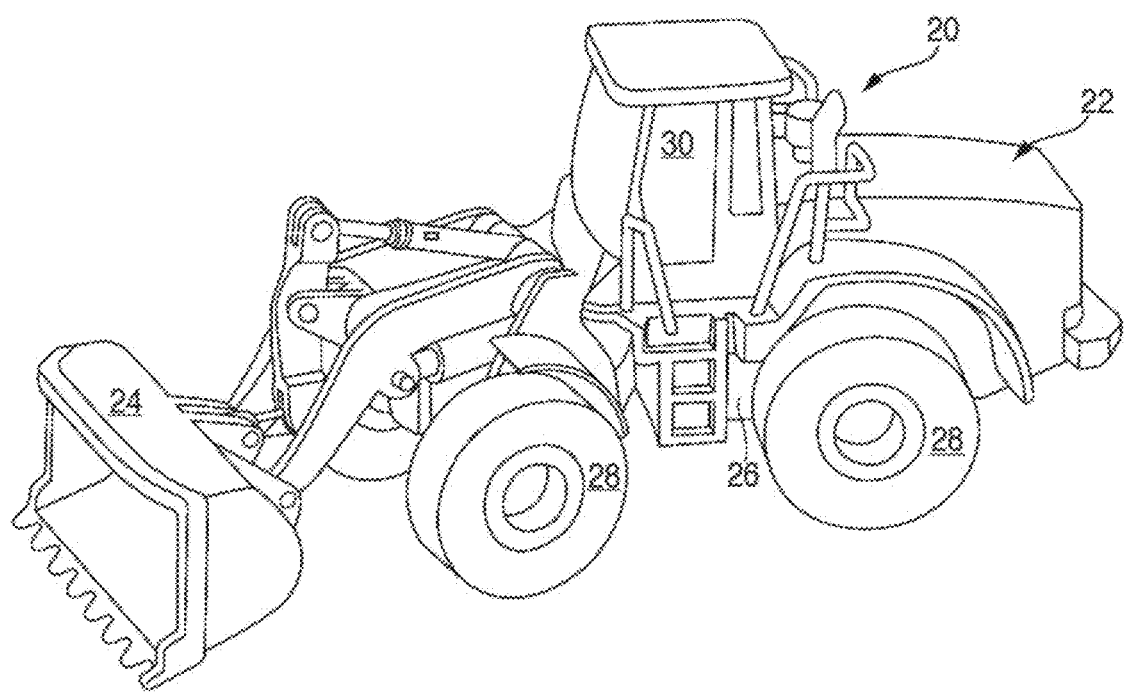
FIG. 1 is an outline view of a machine in accordance with the disclosure.

The present disclosure relates to powertrains and, specifically, to one or more compressors that are associated with one or more turbochargers used on an internal combustion engine. More specifically, the present disclosure describes various embodiments for control strategies that assume or affect normal engine operation, especially during conditions that are known to cause the one or more compressors to surge during engine operation. In one proposed solution, for example, for a wheel loader application, includes maintaining a mass flow of air through the compressor above a surge limit by, during an engine speed and load drop, maintaining the engine speed higher.

In general, during operation of a turbocharged engine, the turbine extracts energy from the exhaust and drives the compressor. When load is suddenly reduced, the exhaust energy drops and the turbine no longer has the power to drive the compressor to keep the speed up, thus the flow rate thru the compressor drops faster than the pressure on the outlet drops, resulting in a surge. For example, in a wheel loader operating on a typical cycle, when the throttle command is dropped, load is still being applied to the engine, which can cause engine speed to rapidly reduce. When this happens, energy to the turbine is also reduced, which reduces energy input to the compressor. Engine MAF is also reduced. These reductions cause a drop in compressor pressure ratio, which will often cause the compressor to surge. In certain conditions, a momentary increase in pressure ratio at the compressor may occur due to the rotational momentum of the compressor impeller. In accordance with the present disclosure, controlling the desired engine speed to ensure that engine MAF is above a compressor surge limit is maintained, which helps reduce or eliminates the compressor surge by maintaining air intake to the engine above a certain level and also maintains some exhaust energy, thus providing more power to the turbine to help maintain compressor speed and, thus, compressor flow rate.

The extent to which engine speed is dynamically increased and maintained higher can be obtained, calculated or determined by back calculating a minimum total corrected mass air flow required to maintain a pressure ratio of the compressor below a pressure ratio limit or "surge line" in the compressor map while maintaining a mass flow at a given pressure ratio. Once the mass flow of air has been determined, the engine speed required to maintain the total mass air flow in the engine to prevent the back flow from intake back to the turbo is calculated and maintained. In certain embodiments, it has been found that surge can be exacerbated and occur at higher mass flows of air as altitude increases. Accordingly, in certain embodiments, altitude is compensated. Lastly, while engine speed to avoid surge is carried out, engine speed control is minimized or focused to avoid a reduction of machine control by the operator. For example, the described control system embodiments may permit engine speed changes down to about 1200 engine RPM without appreciable control, and then assume control of a minimum allowable engine speed to avoid surging.

In one disclosed embodiment, a maximum rate limiter on the desired engine speed is implemented. In this embodiment, the rate limit change necessary to limit compressor surge is used while also allowing the speed change necessary to maintain the desired or expected machine performance by the operator. In one embodiment, fuel is provided to the engine while the engine speed is being reduced, which controls the rate at which engine speed, and thus mass flow of air through the compressor, is reduced, to maintain the compressor below the surge line during a load drop. The timing of the extra fueling is important and is carried out after a load drop is detected and at a peak of the engine speed overshoot. The method for adding the extra fuel is to increase desired engine speed to a percentage of the maximum of the engine speed overshoot value. This increase of desired speed will cause the engine speed governor to increase desired fuel. This desired engine speed offset is then decayed over a specified amount of time.

The engine controls disclosed herein are suitable for use in vehicle powertrains such as passenger automobiles, trucks, machines and other land-based vehicles, as well as for other applications such as in marine propulsion systems, stationary machines, and the like. The particular applications to a machine described herein are equally applicable to other types of machines having different types of transmissions. Therefore, one exemplary application to a wheel loader is shown herein, but it should not be construed as limiting the scope of the disclosure or the claims.

Referring now to the drawings, in which like reference numerals represent like parts throughout the several views, FIG. 1 shows a loader 20 in accordance with an embodiment. The loader 20 includes a vehicle portion 22 connected to a bucket 24 or other implement on a front side of the vehicle portion 22. The vehicle portion 22 includes an articulated chassis 26, which is embodied here as a frame for the vehicle portion 22 that is typically formed from steel or other metal. The chassis 26 supports various parts of the loader 20, either directly or indirectly, such as an engine, body panels, hydraulic systems, and other parts. The chassis 26 itself is supported by a plurality of wheels 28 that are rotatably connected to the chassis 26. An operator occupies a cab 30, which is part of the vehicle portion 22 and is attached to an upper middle section of the chassis 26. As shown, the cab 30 is an enclosed structure that houses the operator of the loader 20 during operation. The various operator controls of the machine, which are not shown for simplicity, can include various pedals, levers, switches, sticks, and/or any other types of devices that the operator can use to control the motion of the machine and implements.

In the illustrated embodiment, the loader 20 has a bucket 24 located at a front portion thereof. The bucket 24 is made from metal and comprises two parabolic or similarly-shaped plates having a metal plate curved about the perimeter of each plate and extending horizontally between them so as to form a concave enclosure opening away from the loader 20. In general, the bucket may have any shape capable of holding a payload.

Figure 2:
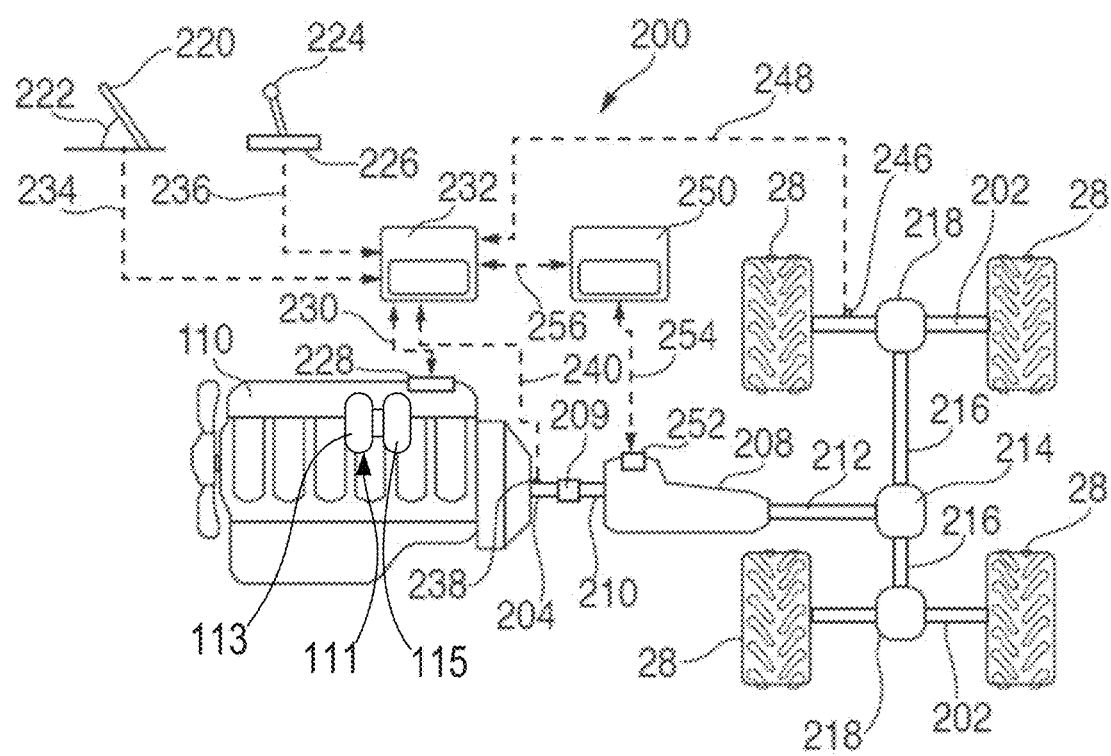
FIG. 2 is a schematic view of a power train for a machine in accordance with the disclosure.

FIG. 2 is a schematic of a powertrain 200 of the loader 20. The loader 20 includes two axles 202 connected to ground engaging members, in this case, the wheels 28. The chassis 26 also supports an engine 110, which has an output shaft 204 connected to a continuously variable transmission (CVT) 208 via a connecting shaft 210 and a coupling 209. Relevant to the present disclosure, the engine 110 includes a turbocharger 111 (shown in FIG. 2) having a compressor 113 and a turbine 115 which are connected to the engine's intake and exhaust systems, as is known. An output shaft 212 of the CVT 208 is connected to a splitter 214 that powers two drive shafts 216, one for each axle 202. The CVT 208 is configured to selectively transform an engine speed and torque provided from the engine 110 at the connecting shaft 210 to a variable speed and torque at the output shaft 212, which is then applied to drive the ground engaging members or wheels 28.

Each drive shaft 216 transmits power to the wheels 28 via a respective differential 218 such that rotational power provided at the engine output shaft 204 is effectively transmitted to the wheels 28. Although two driven axles 202 are shown, a single axle or more than two axles may be used depending on the type of vehicle. Moreover, although wheels are shown, other types of ground engaging members, such as tracks, may be used.

The operator cab 30 houses various machine control devices, as previously described. As shown in FIG. 2, such devices can include an accelerator pedal 220 having an accelerator pedal sensor (APS) 222, and a gear selector lever 224 having a lever encoder 226. The APS 222 and lever encoder 226 may be configured to provide signals indicative of the desired ground speed of the loader 20 that is commanded by an operator during use.

The engine 110 has an interface 228 that is connected to a communication channel 230 with an engine controller 232. The engine controller 232 operates to monitor and control the function of various engine systems, such as monitor sensor readings from various engine sensors, control engine speed and load output and so forth, by receiving information and transmitting commands to various engine components through the communication channel 230. As shown, the engine controller 232, or another controller connected to the controller 232, is further connected to various vehicle components that can control the operation of the engine.

The controller 232 is an electronic controller that includes a processor operably associated with other electronic components such as a data storage device and the various communication channels. In the illustration of FIG. 2, a throttle communication channel 234 and a gear ratio selection encoder communication channel 236 are connected to the controller 232 and configured to provide to the controller 232 information indicative of the operator's commands, such as the desired engine speed or load, the desired forward or reverse travel direction of the machine and the like.

The controller 232 is further configured to receive information indicative of the operation of the remaining portion of the powertrain 200. In this way, the controller 232 is connected to an engine output shaft speed sensor 238 via an engine speed communication channel 240, to a vehicle ground speed sensor 246 via a ground speed communication channel 248, and to other sensors, which are not shown for simplicity.

The powertrain 200 further includes a transmission controller 250 that is configured to control the operation of the continuously variable transmission (CVT) 208. Accordingly, the transmission controller 250 is connected to an interface 252 of the CVT 208 via a transmission communication channel 254. The interface 252 may include structures that can selectively adjust the gear ratio of the CVT 208 in response to commands from the transmission controller 250 and/or the controller 232, as well as provide information to the transmission controller 250 indicative of the current gear ratio of the CVT 208, and other information, such as the power transmitted to the wheels 28 through the CVT 208, the speed of the output shaft 212, the speed of the connecting shaft 210, and the like. During operation, the transmission controller 250 may command gear ratio changes to the CVT 208 based on predetermined connecting shaft speed thresholds for up-shift and downshift changes.

Under certain operating conditions, for example, when the loader 20 is filling the bucket 24 by driving into a pile of material, the engine 110 will work close to its full load condition and the loader 20 pushes the bucket 24 into the pile. When motion into the pile stops, or when the bucket is full, the transmission controller 250 will signal a holding torque and then drop the torque to allow the loader to back away from the pile. When the torque in the transmission drops, the engine load and also the engine speed will also drop from the high or max load condition to almost a no-load condition, which creates conditions favorable for a compressor surge.

In the illustrated embodiment, the engine controller 232 is arranged and configured to maintain sufficient engine speed, and thus airflow into the engine and through the compressor, to avoid a surge. This can be accomplished by various control techniques, some exemplary embodiments for which will now be described. These embodiments calculate, in real time, a speed limit below which the compressor might surge, and then use the speed limit to monitor engine speed and adjust the engine speed, especially under conditions of dropping engine speed and load, which may otherwise create favorable surge conditions, to prevent a surge.

Figure 3:
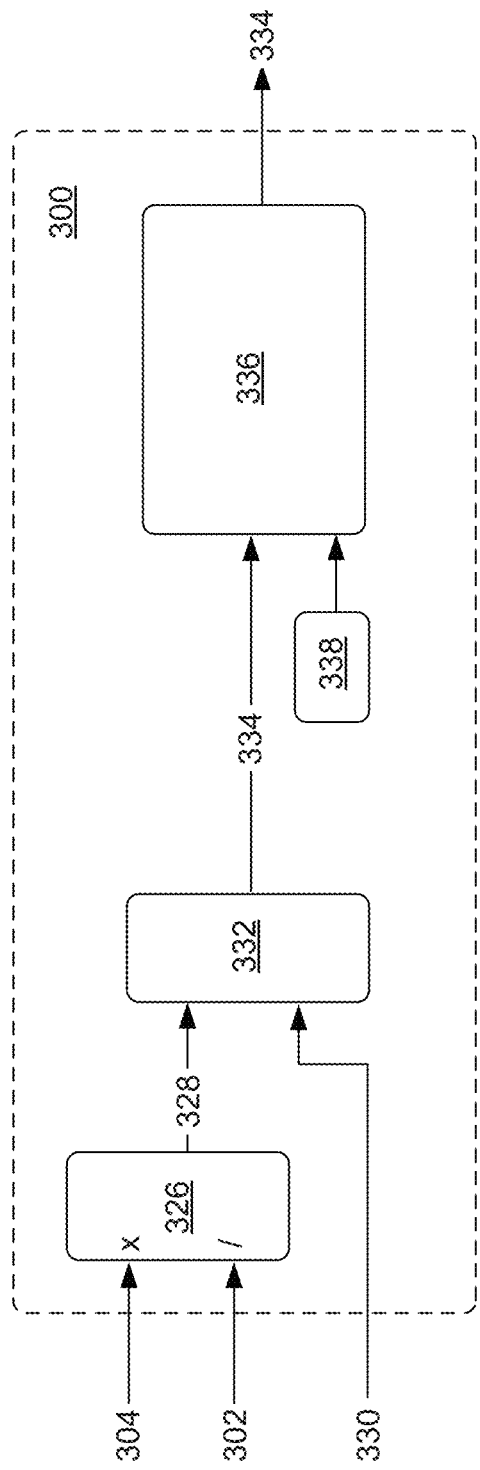
FIG. 3 is a block diagram for a controller in accordance with the disclosure.
Figure 4:
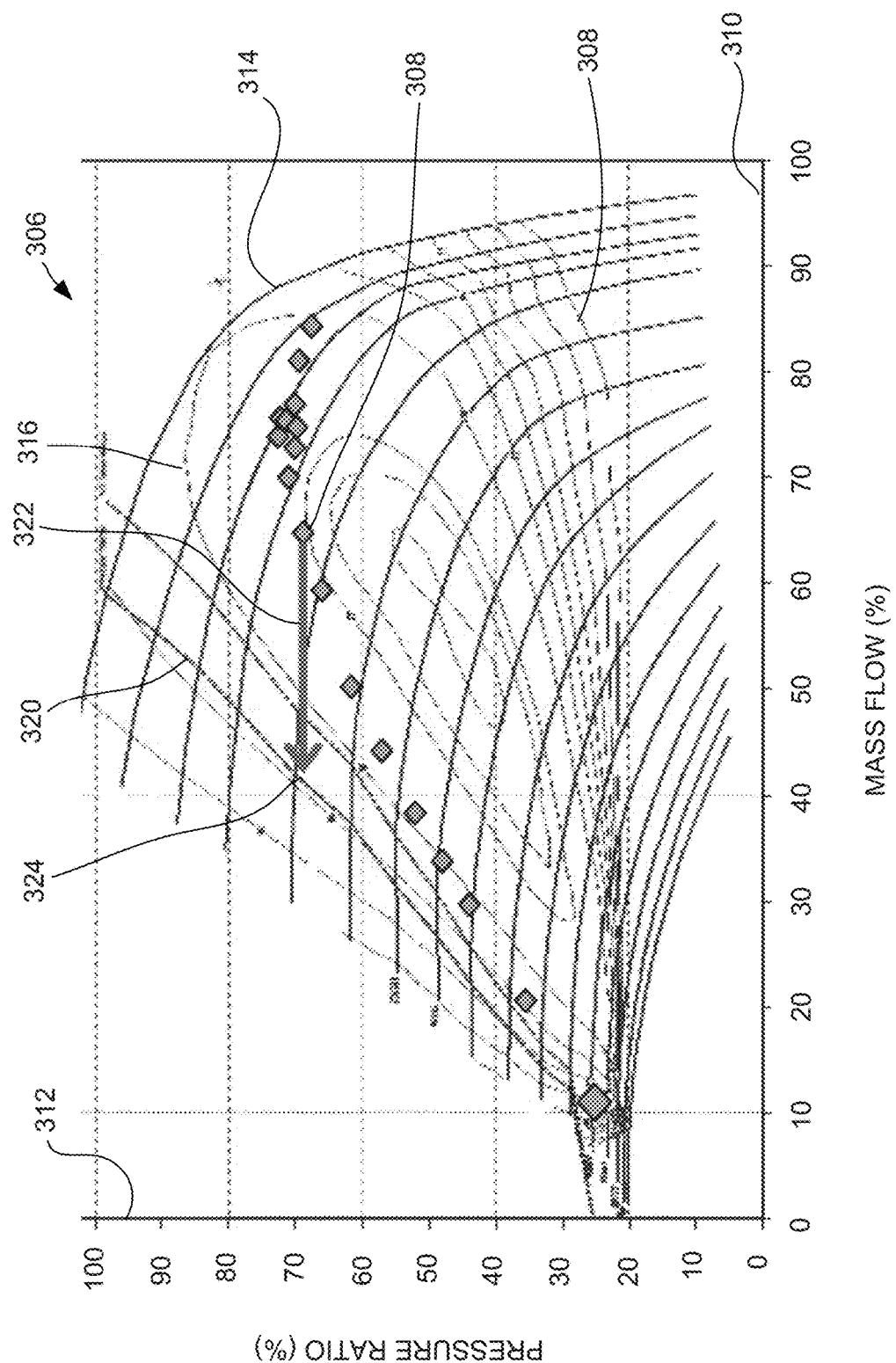
FIG. 4 is a graphical representation of various compressor operating conditions plotted on a compressor map.

Accordingly, one embodiment for a minimum engine speed limit calculator 300 is shown in FIG. 3. The calculator 300 operates within a controller associated with the loader 20 and is configured to receive and process, as well as provide, various operating parameters of the loader 20 including the engine 110. In the illustrated embodiment, the calculator 300 receives as inputs an engine mass air flow (MAF) signal 302, which is indicative of the mass flow if fresh air entering the engine, and also a MAF surge limit signal 304, which is indicative of the MAF that will cause a compressor surge at the then present engine operating conditions. The MAF surge limit signal 304 may be a parameter that is interpolated from a table or that is otherwise calculated in real time based on the operating point of the compressor on a compressor map with respect to pressure ratio across the compressor and the compressor impeller speed. An exemplary compressor map 306 is shown in FIG. 4 to illustrate these parameters.

The compressor map 306 can include engine operating points 308 that can be plotted onto a graph having compressor mass flow 310 extending along the horizontal axis and pressure ratio 312 across the compressor extending along the vertical axis. The compressor map 306 further provides information relative to compressor behavior with respect to the speed of the impeller and efficiency of the compressor. Accordingly, the compressor map 306 as shown includes turbocharger speed lines 314 and efficiency islands 316 which indicate, respectively, the speed of the impeller and the overall efficiency of the compressor in converting the mechanical input to the impeller into pressurization of the working fluid. At the high end of mass flow and at relatively low pressure ratios, the compressor map 306 includes a choke line 318, which represents the minimum pressure ratio for a given mass flow that a compressor can produce, and at the low end of the mass flow the map includes a surge line 320, which represents the pressure ratio limit for a given mass flow above which fluid will flow backwards through the compressor.

While various parameters can be determined or measured by appropriate engine sensors, for example, a MAF sensor, they can also be calculated in addition to or instead of being measured. Accordingly, in an alternative embodiment, the surge speed limit can be calculated based on air temperature, pressure and flow rate for air entering the engine. A sample calculation for the engine MAF is provided in Equation 1 below:

$$TMAF = \frac{IMAP}{IMAT(K)*R} * spd * Vol_{cyl} * \frac{\#cyl}{2} * \gamma_{vol} \quad \text{Equation 1}$$

where "TMAF" represents the fresh air intake into the compressor, "IMAP" represents intake manifold absolute pressure, "IMAT" represents manifold absolute temperature, "R" is the ideal gas constant, "spd" represents engine speed, "$Vol_{cyl}$" represents engine cylinder volume, "#cyl" represents number of cylinders, and "$\gamma_{vol}$" represents the ratio of specific heats for air. A manipulation of Equation 1 can provide the surge speed limit, as shown in Equation 2 below:

$$spd\_lim_{surge} = TMAF * \frac{IMAT(K)*R*2}{IMAP*Vol_{cyl}*\#cyl*\gamma_{vol}} = \quad \text{Equation 2}$$
$$TMAF * \frac{IMAT(K)}{IMAP*\gamma_{vol}} * K$$

where "K" is a constant that contains engine data and scaling information.

In reference to FIG. 4, relative to the present discussion, the compressor, for example, the compressor 113 (shown in FIG. 2) may be operating at the operating point 308 that is denoted by an arrow in FIG. 4, when the engine is operating at a high load setting. When the load from the engine is removed, and the engine speed drops, the engine MAF will also drop causing the engine operating point 308 to move towards the left side of the compressor map 306 as indicated by the arrow 322 and approach the surge line 320 at a surge point 324. The MAF of the engine at the surge point 324 is the MAF surge limit signal 304 referenced in the block diagram of FIG. 3.

Returning now to FIG. 3, the MAF signal 302 and the MAF surge limit signal 304 are provided to a ratio calculator 326, which calculates a MAF surge ratio 328. The MAF surge ratio 328 is ordinarily a parameter less than one, which indicates that the engine MAF is greater than the MAF limit. As the MAF surge ratio 328 approaches one, the compressor is approaching a surge condition. The calculator 300 further receives an engine speed signal 330, which is multiplied by the MAF surge ratio 328 at a multiplier 332 to provide a surge speed limit 334. As can be appreciated, because the MAF surge ratio 328 is less than one, the surge speed limit 334 will be less than the engine speed signal 330 under normal operating conditions, and will approach the same as the compressor is approaching a surge condition. Therefore, the surge speed limit 334 represents a minimum speed limit that the engine can operate in while the compressor is not surging. It is also noted that the MAF surge limit signal 304 may be arranged to include a safety margin, for example, 5% of the surge engine MAF such that the surge speed limit 334 of the engine will always above a true surge speed condition of the compressor. To minimize fluctuations in the surge speed limit 334, a filter 336, for example, a single pole low pass filter, which may use a filter factor 338, is applied to the surge speed limit 334 before the surge speed limit 334 is output from the calculator 300.

Figure 5:
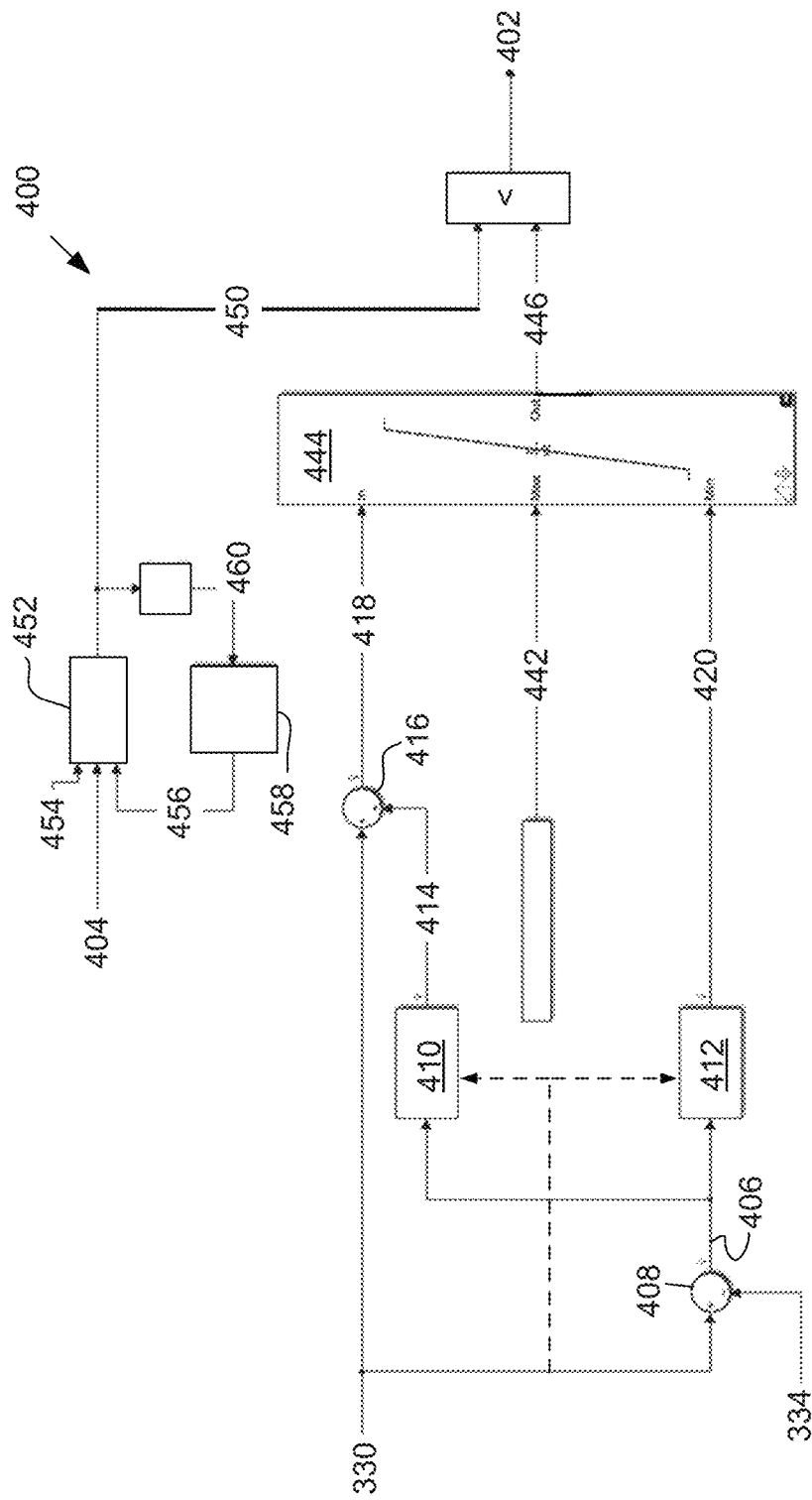
FIG. 5 is a block diagram of a compressor anti-surge control strategy in accordance with the disclosure.

A block diagram for an engine speed controller 400 is shown in FIG. 5. The engine speed controller 400 operates to provide a minimum engine speed setting 402 that takes in consideration surge limits for the engine's compressor(s) as well as operator engine speed commands. The engine speed controller 400 receives as inputs the surge speed limit 334 (see FIG. 3) discussed above, the engine speed signal 330, and also an operator desired engine speed 404, which may be provided by an operator control device such as an accelerator pedal or lever. A difference between the surge speed limit 334 and the engine speed signal 330, which difference represents a surge speed margin 406, is calculated at a difference operator 408 and is provided to an offset map 410 and to a lower limit map 412. The offset map 410, or an equivalent calculator function, determines a desired offset or safety margin 414 to apply to the engine speed based on the difference or surge speed margin 406. The safety margin 414 accounts for dynamic effects of the engine and is added to the engine speed signal 330 at an adder operator 416 to provide an adjusted engine speed 418. The lower limit map 412 provides a lower speed limit 420, which depends on the surge speed margin 406 for stability purposes.

In one alternative embodiment, each of the offset map 410 and lower limit map 412 is a three dimensional lookup function that receives as engine speed signal 330 as an additional input. This embodiment is also illustrated in FIG. 5 with the additional engine speed inputs shown in dashed line. By adding the engine speed as an additional lookup parameter, the corresponding offset contribution of the offset map 410 and the lower speed limit 420 can be adjusted to provide increased sensitivity at lower engine speeds and reduced sensitivity at higher engine speeds and, thus, higher engine MAF, where the surge line is far from the operating point of the compressor, for increased system stability and control robustness.

The lower speed limit 420, the adjusted engine speed 418, and an upper speed limit 422, are provided to a rate limiter function 444 that provides the adjusted engine speed 418 at its output while the adjusted engine speed 418 is between the upper speed limit 422 and the lower speed limit 420. I other words, the adjusted engine speed 418 is, in most cases, the actual engine speed, but with limits imposed to avoid reducing engine speed below the lower speed limit 420, which accounts for avoiding a compressor surge, as discussed above. In alternative embodiments, additional parameters may be used an inputs to the offset map 410 and the lower limit map 412 to correct for environmental factors such as altitude and ambient temperature, either or both of which can be used as additional inputs to the lookup functions. Specifically regarding temperature, a lookup function can be used to calculate a correction factor, which can be applied to shift the adjusted engine speed 418 and the lower speed limit 420 according to the density of the air ingested by the compressor.

To add robustness to the system and also account for operator commands, the adjusted engine speed 446 is further compared with an operator desired speed limit 448 at a comparator 450 that selects the minimum of the two parameters as the minimum engine speed setting 402. In this respect, in the illustrated embodiment, the operator desired engine speed 404 is provided to a dynamic rate limiter function 452 that limits speed change requests by the operator between a fixed upper limit 454 and a variable lower limit 456. The variable lower limit 456, which limits the rate of engine speed reduction, can be programmed to allow for fast engine speed changes when the engine operates at higher speeds, for example, above 1200 RPM, but to slow the rate of engine speed at low engine speeds to ensure that the engine will not stray into a surge condition. This is accomplished by a rate map 458 that provides the variable lower limit 456 based on a delayed and delimited operate desired engine speed 460, which is provided by the dynamic rate limiter function 452.

INDUSTRIAL APPLICABILITY

The present disclosure is applicable to any type of machine or vehicle, including on- or off-highway vehicles, that have a powertrain that includes a device capable of varying an actual or equivalent gear ratio between a prime mover, for example, an engine, and ground engaging members, for example, wheels. In one disclosed embodiment, a lower engine speed limit is established that will constrain engine speed to be above a dynamically calculated or determined speed limit that corresponds to a compressor surge condition of a compressor mounted on the engine.

Figure 6:
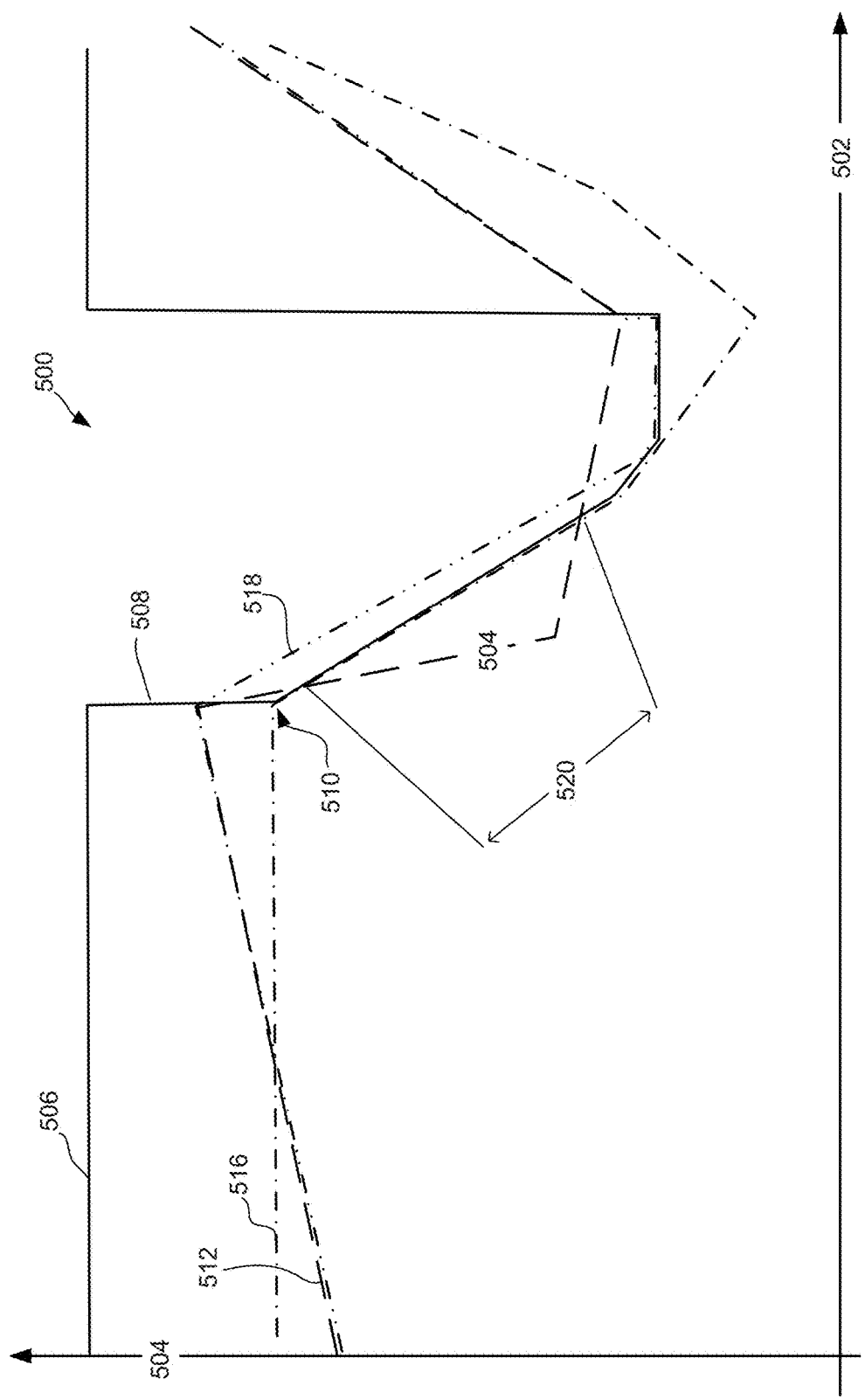
FIG. 6 is a graphical representation of various engine operating parameters during operation of a compressor anti-surge control strategy in accordance with the disclosure.

A sample time trace 500 of various engine parameters during operation that would otherwise have caused an engine compressor to surge is shown in FIG. 6. In this illustration, time is plotted against the horizontal axis 502 and engine speed is shown along the vertical axis 504. In this chart, the operator desired engine speed 506, which is shown in solid line and may represent an operator command or an automatic engine speed setting due to a change in the operating state of the transmission, is steady for a first time period and drops for a segment 508 until it reaches an intervention speed 510, at which point the drop is halted and the rate of decrease is controlled to avoid a compressor surge. An actual engine speed 512, which is shown in dashed line and which represents the speed of the engine had no intervention had occurred by a system in accordance with the disclosure, is accelerating towards the target during an initial period, and gradually decreases over a segment 514 that immediately follows application of the intervention speed 510. A surge speed limit 516, which is shown in dash-dotted line, arrests the dropping engine speed at the intervention speed 510, while an engine speed lower limit 518, shown in dot-dot-dashed line, at all times after the intervention speed 510 remains higher than both the actual engine speed 512 and also the surge speed limit 516.

As can be appreciated, in the event the actual engine speed 512 represented the operating speed of the engine during this event, the compressor would have surged over a segment 520 in which the surge speed limit 516 (dot-dashed line) is greater than the actual engine speed 512 (dashed line). During the segment 520, however, and indeed beyond that time, the engine speed lower limit 518 (dot-dot-dashed line) is higher than the actual engine speed 512 and the surge speed limit 516, which avoids a compressor surge.

Figure 7:
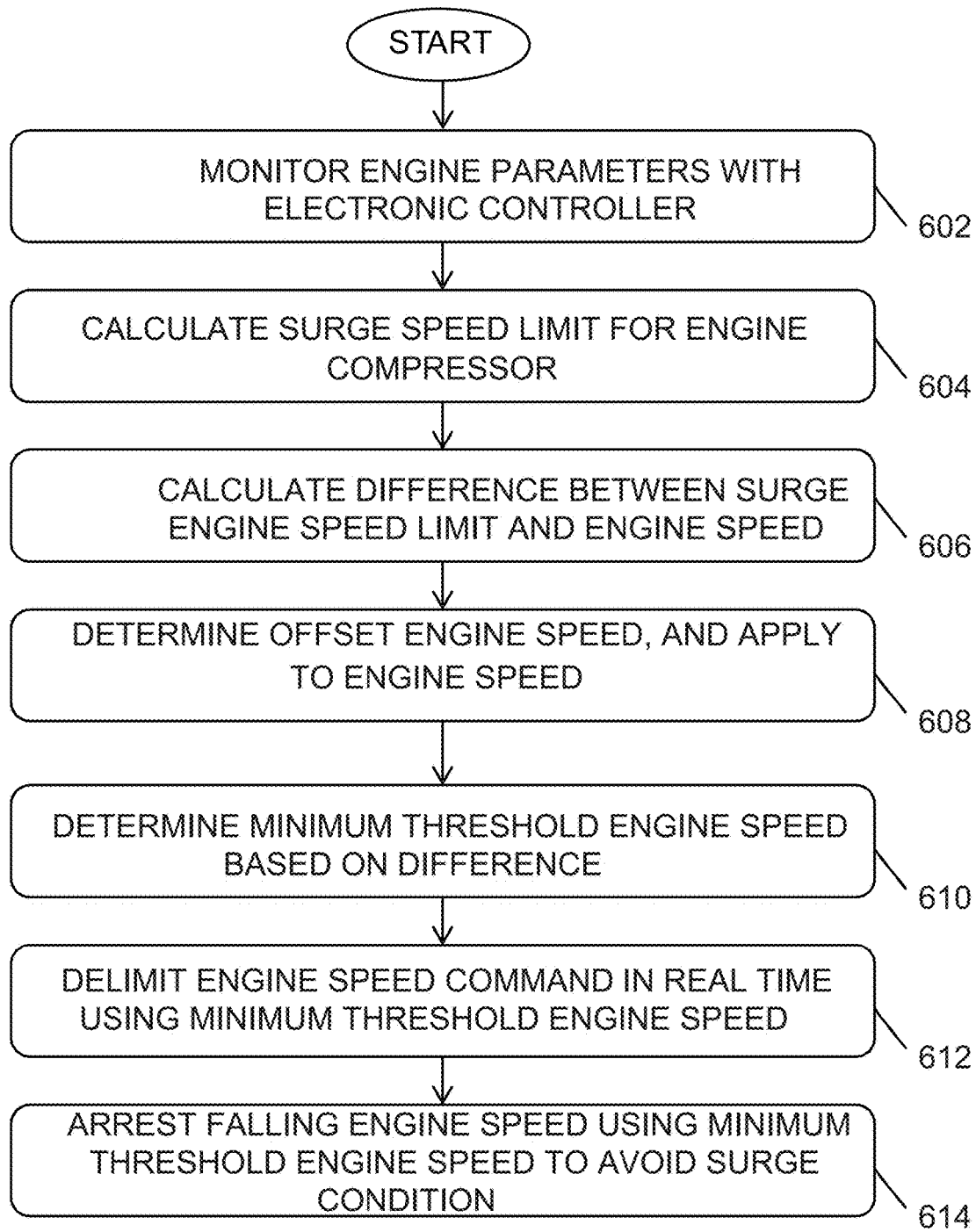
FIG. 7 is a flowchart for a method of avoiding engine compressor surging in accordance with the disclosure.

A flowchart for a method of controlling an engine to avoid a surge in an engine compressor is shown in FIG. 7. The process begins by monitoring various engine parameters with an electronic controller at 602. The engine parameters monitored can include, but are not limited to, engine speed, engine load, a desired engine speed or load by the operator, an engine MAF, ambient temperature, barometric pressure, and the like. Using at least some of the monitored parameters, the process includes calculating in an electronic controller a surge speed limit for an engine compressor at 604. The surge speed limit calculation may include the calculation of a ratio between a surge limit, which is interpolated by a table or otherwise determined or calculated, with the engine MAF, and the normalization of the same based on engine speed to determine a surge engine speed limit factor, which may be further filtered.

A difference or margin between the surge engine speed limit and the then present engine speed may be calculated at 606. This margin, which is indicative of how far the engine operating point may be from a surging condition, may be used to determine an offset at 608 and minimum threshold engine speed at or below which surging is likely at 610. The offset is added to the engine speed to provide an adjusted engine speed that is passed through the system as an output. The threshold engine speed may be used to delimit an engine speed command, continuously and on a real time basis during engine operation at 612, to ensure that a fall in engine speed or engine load is arrested to avoid a surge condition by applying an intervention at 614 that sets a minimum allowed engine speed to be at least equal to the minimum threshold engine speed. Optionally, the intervention may further include an adjustment to an operator desired engine speed for a limited time and while the engine compressor may surge during service.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. A method for operating an engine, comprising:
   monitoring engine parameters using an electronic controller;
   determining a surge speed limit for the engine based on a compressor map, the surge speed limit for the engine representing an engine speed below which operating conditions of a compressor of the engine will cause the compressor to surge;
   determining an offset engine speed based on a margin between the surge speed limit and the engine speed;
   determining a minimum engine speed based on the margin;
   applying the offset engine speed to an engine speed signal to provide an adjusted engine speed; and
   applying the adjusted engine speed to a desired engine speed when a speed of the engine approaches the surge speed limit.

2. The method of claim 1, further comprising delimiting the adjusted engine speed between a maximum threshold engine speed and the minimum engine speed.

3. The method of claim 1, wherein determining the surge speed limit includes interrogating the compressor map to determine a surge mass airflow for the compressor, the surge mass airflow representing an airflow through the compressor at an engine operating pressure ratio across the compressor that will cause the compressor to operate in a surge condition.

4. The method of claim 3, further comprising calculating a ratio between an engine mass airflow (MAF) and the surge mass airflow to determine a MAF surge ratio.

5. The method of claim 4, wherein the MAF surge ratio is a non-dimensional parameter that is less than one when the engine is operating at an engine MAF that is more than the surge mass airflow.

6. The method of claim 4, wherein determining the surge speed limit further includes multiplying the engine speed with the MAF surge ratio to yield the surge speed limit.

7. The method of claim 1, further comprising applying the adjusted engine speed to the desired engine speed commanded by an operator using the adjusted engine speed.

8. An internal combustion engine, comprising:
   a turbocharger having a turbine connected to an exhaust system of the internal combustion engine and a compressor connected to an intake system of the internal combustion engine;
   a mass airflow (MAF) sensor disposed to provide a MAF signal that is indicative of an engine MAF entering the compressor;
   at least one pressure sensor disposed to provide a pressure signal that is indicative of a pressure ratio across the compressor;
   an engine speed sensor disposed to provide an engine speed signal that is indicative of an engine speed of the internal combustion engine;
   an electronic controller associated with the internal combustion engine and arranged to receive and monitor the MAF signal, the pressure signal and the engine speed signal, the electronic controller operating to provide a desired engine speed signal to the internal combustion engine;
   wherein the electronic controller is programmed to:
      store in non-volatile memory a compressor map onto which an operating point of the compressor can be determined based on the MAF signal and the pressure signal, the compressor map further including a surge line at which the compressor will operate in a surge condition;
      determine, based on the compressor map, a surge speed limit for the engine speed, the surge speed limit representing the engine speed below which the compressor will surge;
      determine an offset engine speed based on a margin between the surge speed limit and the speed of the internal combustion engine;
      determine a minimum desired engine speed based on the margin;
      apply the offset engine speed to the engine speed signal to provide an adjusted engine speed; and
      apply the adjusted engine speed to the desired engine speed signal.

9. The internal combustion engine of claim 8, wherein the electronic controller is further programmed to delimit the adjusted engine speed between a maximum threshold engine speed and the minimum desired engine speed.

10. The internal combustion engine of claim 8, wherein the electronic controller is further programmed to interrogate the compressor map to determine a surge MAF for the compressor, the surge MAF representing an airflow through the compressor at an engine operating pressure ratio across the compressor that will cause the compressor to operate in a surge condition.

11. The internal combustion engine of claim 10, wherein the electronic controller is further programmed to calculate a ratio between the engine MAF and the surge MAF to determine a MAF surge ratio.

12. The internal combustion engine of claim 11, wherein the MAF surge ratio is a non-dimensional parameter that is less than one when the internal combustion engine is operating at an engine MAF that is more than the surge MAF.

13. The internal combustion engine of claim 11, wherein the electronic controller is further programmed to multiply the speed of the internal combustion engine with the MAF surge ratio to yield the surge speed limit.

14. The internal combustion engine of claim 8, wherein the electronic controller is further programmed to adjust the speed of the internal combustion engine to a desired engine speed commanded by an operator using the adjusted engine speed.

15. A method for operating an engine having a turbine connected to an exhaust system of the engine and a compressor connected to an intake system of the engine, the method comprising:
   receiving in a controller a MAF signal that is indicative of an engine MAF entering the compressor;
   receiving in the controller a pressure signal that is indicative of a pressure ratio across the compressor;
   receiving in the controller an engine speed signal that is indicative of an engine speed; and
   using the controller to control a speed of the engine;
   wherein the controller is programmed to:
      store in non-volatile memory a compressor map onto which an operating point of the compressor can be determined based on the MAF signal and the pressure signal, the compressor map further including a surge line at which the compressor will operate in a surge condition;
      determine, based on the compressor map, a surge speed limit for the engine speed, the surge speed limit representing the engine speed below which the compressor will surge;

determine an offset engine speed based on a margin between the surge speed limit and the speed of the engine;

determine a minimum desired engine speed based on the margin;

apply the offset engine speed to the engine speed signal to provide an adjusted engine speed; and apply the adjusted engine speed to a desired engine speed signal.

16. The method of claim 15, wherein the controller is further programmed to delimit the adjusted engine speed between a maximum threshold engine speed and the minimum desired engine speed.

17. The method of claim 15, wherein the controller is further programmed to interrogate the compressor map to determine a surge MAF for the compressor, the surge MAF representing an airflow through the compressor at an engine operating pressure ratio across the compressor that will cause the compressor to operate in a surge condition.

18. The method of claim 17, wherein the controller is further programmed to calculate a ratio between the engine MAF and the surge MAF to determine a MAF surge ratio.

19. The method of claim 18, wherein the MAF surge ratio is a non-dimensional parameter that is less than one when the engine is operating at an engine MAF that is more than the surge MAF.

20. The method of claim 18, wherein the controller is further programmed to multiply the speed of the engine with the MAF surge ratio to yield the surge speed limit.

* * * * *